United States Patent

Laznicka

[11] Patent Number: 5,845,810
[45] Date of Patent: Dec. 8, 1998

[54] FEEDER TRACK ASSEMBLY

[75] Inventor: Garry V. Laznicka, Wallingford, Pa.

[73] Assignee: McNeil-PPC, Inc., Skillman, N.J.

[21] Appl. No.: 633,279

[22] Filed: Apr. 16, 1996

[51] Int. Cl.[6] ............................................. B23Q 7/12
[52] U.S. Cl. ............................................ 221/172; 221/289
[58] Field of Search ........................ 221/167, 157, 221/172, 173, 171, 200, 277, 289

[56] References Cited

FOREIGN PATENT DOCUMENTS

| 6012564 | 1/1994 | Japan | 21/172 |
| 1221406 | 2/1971 | United Kingdom | 221/172 |

OTHER PUBLICATIONS

Six (6) drawings of constant cross–section feeder track assemblies

*Primary Examiner*—Kenneth Noland

[57] ABSTRACT

A conveying apparatus for conveying objects under the influence of gravity from a first location where the orientations of said objects are random to a second location where the objects assume a predetermined orientation. The apparatus includes a main body member and a substantially vertical passageway provided in at least a portion of the main body member and through which objects to be conveyed by the conveying apparatus are conveyed. The passageway is preferably constructed to have a first portion including an inlet for receiving the objects, wherein the first portion defines a first cross-sectional configuration. The passageway also includes a second portion having an outlet for discharging the objects, the second portion defining a second cross-sectional configuration different from the first cross-sectional configuration, the second cross-sectional configuration being operable to position objects discharged from the outlet into a predetermined orientation.

13 Claims, 5 Drawing Sheets

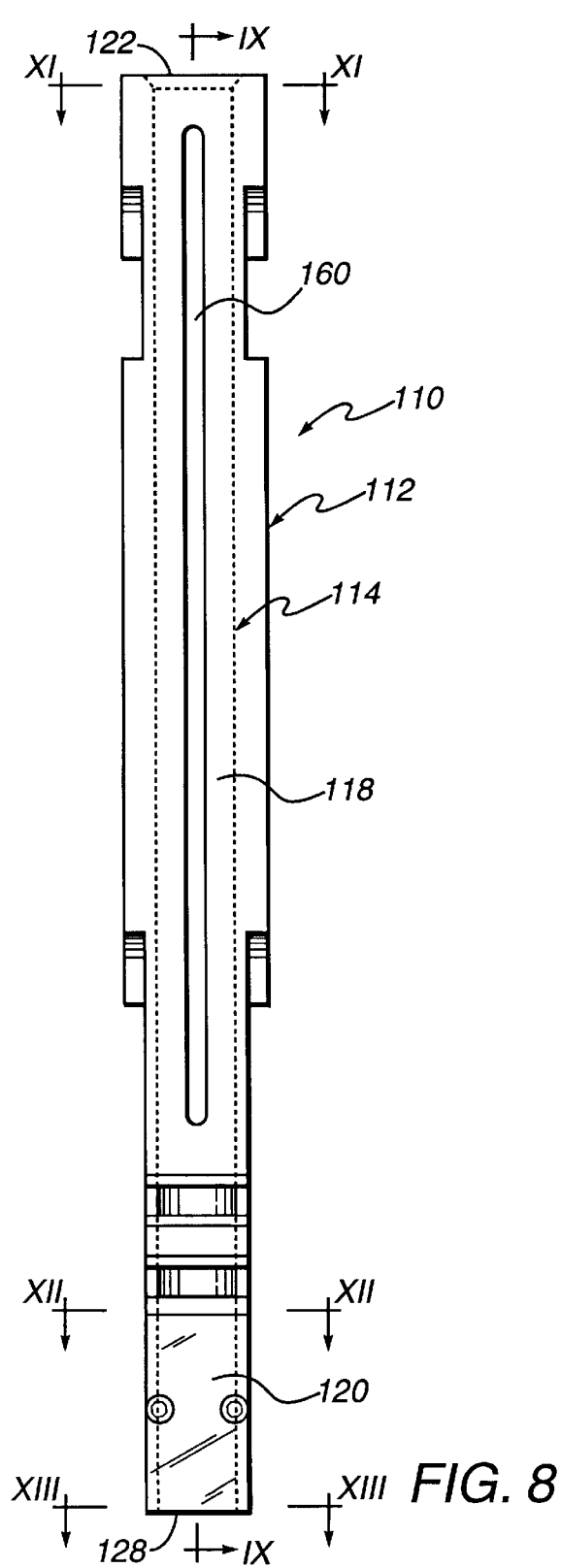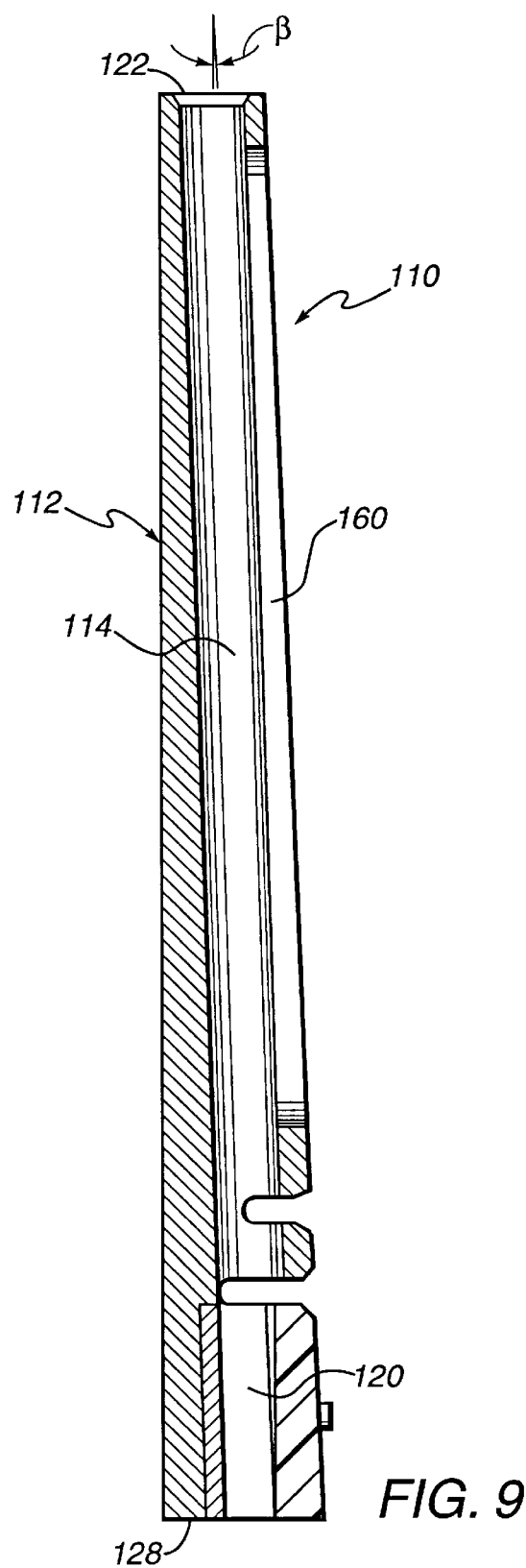

FEEDER TRACK ASSEMBLY

FIELD OF THE INVENTION

The present invention relates in general to conveying apparatus. More particularly, the invention is directed toward apparatus for conveying objects under the influence of gravity from a first location where the orientation of such objects is essentially random to a second location where the orientation of such objects is predetermined and essentially uniform.

BACKGROUND OF THE INVENTION

Conveying apparatus whose principle of operation is founded upon delivery of objects from a first location to a second location under the influence of gravity are among the oldest and most well known in the art. Typical examples of these apparatus include chutes, ramps, and the like. In situations where the orientation of the objects upon arrival at the second location is of little or no import, devices of this sort are generally effective for their intended purposes.

Frequently, however, it is desirable for objects conveyed by gravity influenced conveying apparatus to arrive at an intended destination in a very specific spatial orientation or disposition. For instance, at certain stages in the manufacture of pharmaceutical products such as tablets, caplets, capsules, pills, and the like, individual tablets or similar objects are amassed in a supply means, e.g., a bin or hopper, from which the objects must be delivered to another site for further processing or packaging.

In current practice, it is frequently necessary to convey randomly disposed pharmaceutical products contained in a bin or hopper type supply means individually and in a desired orientation to another location. This function is typically performed by one or more substantially vertically extending conveying apparatus often referred to as a feeder track assembly. A typical feeder track assembly is comprised of an elongate member having an internal throat or passageway of constant cross-section extending the length of the elongate member. The cross-sectional configuration of the passageway may assume any of several shapes including, but not limited to, circular, oval, elliptical, triangular, square, rectangular and more complex forms such as T, +, and X shapes. A metering mechanism divides the passageway into an upper charging portion and a lower discharging portion. The metering mechanism functions to dispense individual objects from the charging portion to the discharging portion at selected intervals. An inlet at the upper end of the charging portion of the passageway receives objects which fall from the supply means under the influence of gravity. The objects in turn fill the charging portion of the passageway and are released individually into the discharging portion of the passageway upon activation of the metering mechanism. Under ideal conditions, objects passing through the discharging portion of the passageway are positioned into a desired orientation and delivered at said desired orientation through an outlet at the lower end of the discharging portion of the passageway to a desired destination such as a packaging container or processing station.

Experience has shown that passageways having constant cross-sectional shapes may hinder effective operation of existing feeder track assemblies. More specifically, if the cross-sectional dimensions of the feeder track passageway are greater than the largest dimensions of the objects conveyed therethrough, then the objects typically fill the upper charging portion of the passageway without jamming, wedging or otherwise encountering obstructive resistance. On the other hand, an oversized passageway is inherently incapable of positioning an object into a desired orientation as it traverses the discharging portion of the passageway.

Conversely, other feeder track passageways have constant cross-sectional shapes that are specially contoured to closely accommodate the exterior shapes of the objects they are designed to convey. Such product-specific feeder track passageways are problematic for several reasons. For example, feeder tracks of this sort typically are able to pass only those objects that are aligned in a specific orientation upon entering the feeder track passageway. Hence, any object delivered from a supply means that is not in precise alignment with the passageway inlet cannot enter the feeder track.

In addition, the spatial tolerances of such passageways are very strict. The purpose of such close tolerances is to assure that objects conveyed by the passageway are delivered in single file from the inlet to the metering mechanism. A disadvantage of tight product tolerances, however, is that products which successfully enter the passageway inlet frequently shift and become wedged or jammed as they fall through the passageway. This phenomenon is especially pronounced when the feeder track assembly is used to convey pill-like pharmaceutical products such as tablets and caplets. Existing technology is constrained from producing pill-like pharmaceutical products of perfectly uniform size and shape because of the physical characteristics of the compositions which make up the pharmaceuticals and/or their coatings. By way of illustration, gel-coated tablets are notorious for exhibiting considerable variance in coating thickness among different tablets, as well as across the outer surface of individual tablets. Apart from increasing the likelihood of jamming, the variability in the size and shape of such products can also inhibit their successful entry into the inlet of a feeder track passageway having tight product tolerances.

Moreover, a feeder track assembly having a passageway of constant, product-specific cross-section may also malfunction with respect to objects that have successfully entered the passageway and reached the metering mechanism. More particularly, activation of the metering mechanism usually results in some shifting of an object as it is dispensed from the charging to the discharging position of the passageway. This shifting frequently is sufficient to cause the object to become misaligned and, therefore, wedged or jammed in the discharge portion of the passageway.

A need exists, therefore, for a feeder track assembly that is capable of conveying objects of substantially uniform size and shape under the influence of gravity from a first location, such as a hopper, where the orientation of such objects is essentially random, to a second location, such as a packaging container or processing station, where the orientation of such objects is predetermined and essentially uniform.

SUMMARY OF THE INVENTION

According to the present invention, there is provided a novel feeder track assembly including an elongate main body member having an internal throat or passageway extending the length thereof. The assembly further includes metering means which divides the passageway into an upper charging portion and a lower discharging portion and functions to dispense individual objects from the charging portion to the discharging portion at selected intervals. In operation, the main body member is disposed substantially vertically such that an inlet at the upper end of the passageway receives objects which fall from a supply means under the influence of gravity. The objects in turn fill the charging portion of the passageway and are released individually into the passageway upon activation of the metering means.

The cross-sectional dimensions of the passageway in the upper charging portion are preferably larger in all directions than the largest dimension of the objects intended to be conveyed by the feeder track assembly. By contrast, the cross-sectional shape of the lower discharge portion of the passageway is generally rectangular in shape. Preferably, the cross-sectional dimensions of the generally rectangular discharge portion taper in size from the upstream end to the outlet of the discharge portion. More particularly, at its upstream end, the discharge portion of the passageway may assume a configuration of substantially the same size as or, preferably, slightly smaller than a first rectangular area circumscribing the area of largest cross-sectional dimensions of the conveyed objects. Whereas, at its outlet, the discharge portion preferably assumes a configuration slightly larger than a second rectangular area, wherein the second rectangular area circumscribes a cross-sectional area of the objects to be conveyed that is less than the area of largest cross-sectional dimensions of such objects.

The combination of the main body member and metering means thus may be viewed conceptually as dividing the feeder track assembly of the present invention into several distinct yet cooperating sections.

The first of these sections, which comprises that portion of the main body member extending from the upper end of the main body member to the metering means, may be referred to as the "free transfer section." The free transfer section thus embraces the entire upper charging portion of the internal passageway. Because the cross-sectional dimensions of the upper charging portion are greater than the largest dimensions of the objects being conveyed, the free transfer section, which desirably constitutes that longest segment of the feeder track assembly, will allow objects to travel preferably the majority of the track distance without any restriction or imposition into any predetermined orientation.

The next section, which essentially comprises that portion of the main body member spanned by the metering means, may be referred to as the "escapement section." The cross-sectional dimensions of the passageway in the escapement section are preferably the same as the free transfer section and the height of the escapement section must be at least slightly greater than the smallest cross-sectional dimension of an object to be conveyed. According to techniques known in the art, the metering means preferably is operated so as to capture an object from the upper charging portion of the passageway, momentarily retain the object in the escapement section, and then release the object to the lower discharge section.

The following section, which comprises that portion of the main body member immediately beneath the metering means, may be referred to as the "transition section." The transition section constitutes at least an upper region of the lower discharge portion of the internal passageway. Preferably, the cross-sectional configuration of the transition section should be slightly smaller than a rectangular area circumscribing the area of largest cross-sectional dimensions of a conveyed object. The height of the transition section is desirably no greater than the largest dimension of the conveyed object. And, that portion of the internal passageway spanned by the transition section preferably tapers in size from the escapement section to the end of the transition section. In operation, once an object is released from the escapement section by the metering means, it will fall through the transition section and begin to assume a desired orientation as a result of the specific falling tendency of the object as influenced by the physical constraints of the transition section, gravity, and the specific operation of the chosen metering means.

The final section, which comprises that portion of the main body member extending from the end of the transition section to the outlet of the discharge portion of the internal passageway may be referred to as the "controlled exit section." The controlled exit section thus defines the lower region of the discharge portion of the passageway. The cross-sectional configuration of the controlled exit section is preferably the same as the transition section. The cross-sectional dimensions of the controlled exit section, however, should taper smoothly from the transition section to the outlet of the passageway. Moreover, the cross-sectional configuration of the outlet should be slightly larger than a rectangular area circumscribing a cross-sectional area of the objects to be conveyed which is of lesser cross-sectional dimensions than the largest cross-sectional dimensions of the objects. The height of the controlled exit section is not critical, although the outlet of the controlled exit section should be at an elevation suitable to deliver an object to a desired location and in the orientation prescribed by the walls of the discharge portion at the outlet of the passageway. The controlled exit section's function is to continue orienting an object as initially oriented by the transition section and to discharge the object through the bottom of the feeder track assembly in proper orientation for delivery to its intended destination.

The feeder track assembly according to the present invention is thus capable of reliably conveying objects from a first location, such as a hopper, where the orientation of such objects is essentially random, to a second location, such as a packaging container or processing station, where the orientation of such objects is predetermined and uniform.

BRIEF DESCRIPTION OF THE DRAWINGS

FIG. 8 is a front elevational view of a feeder track assembly according to the present invention with the metering means thereof omitted for clarity of illustration; FIG. 9 is a vertical cross-sectional view of the feeder track assembly of FIG. 8 taken along line IX—IX thereof;

DETAILED DESCRIPTION OF THE INVENTION

Figures 1, 2:
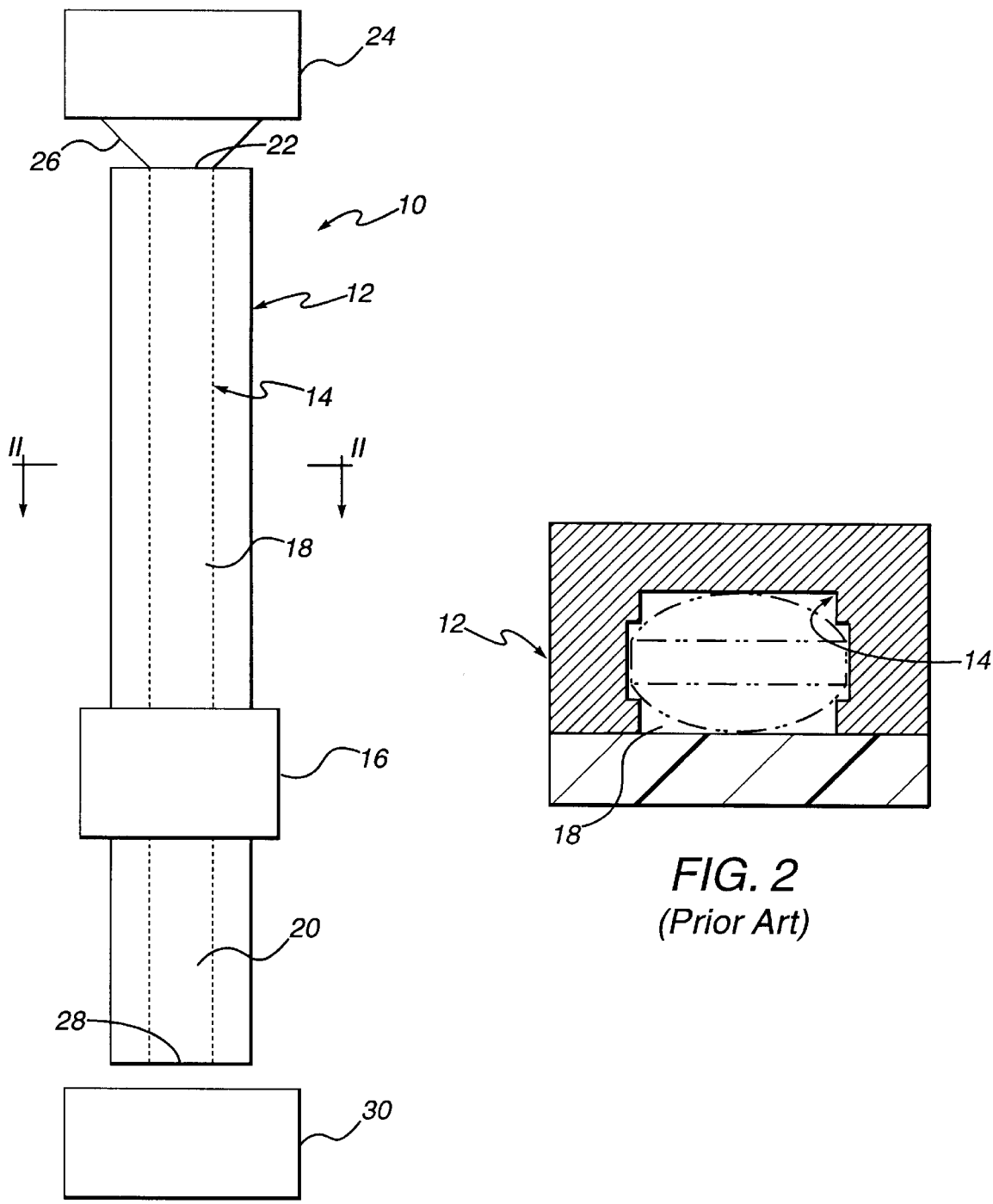
FIG. 1 is a front elevational view of a conventional feeder track assembly.
FIG. 2 is an enlarged horizontal cross-sectional view of a main body member of the feeder track assembly of FIG. 1 taken along line II—II thereof.
Figure 3:
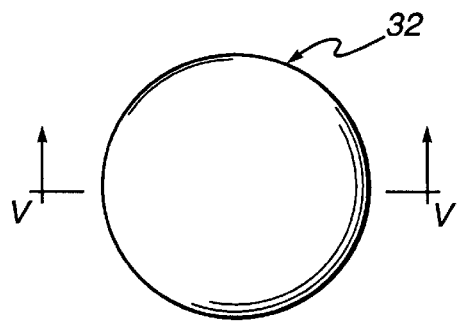
FIG. 3 is a plan view of an object suitable for conveyance by the feeder track assembly of the present invention.
Figure 4:
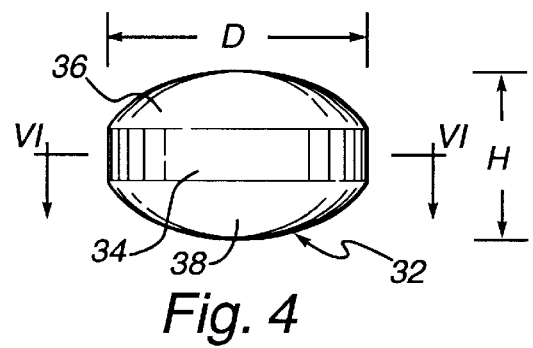
FIG. 4 is a side elevational view of the object shown in FIG. 3.

Referring to FIG. 1, there is shown a feeder track assembly of conventional construction which is identified generally by reference numeral 10. Feeder track assembly 10 typically comprises an elongate, substantially vertically extending member 12 having an internal throat or passageway 14 of constant cross-section extending the length of the elongate member 12. The feeder track assembly 10 also includes a metering mechanism 16 which divides the passageway 14 into an upper charging portion 18 and a lower discharging portion 20. The metering mechanism 16, which oftentimes is alternatively referred to as an escapement mechanism, normally includes one or more movable plates, pins, rubber bands or other members that can be manually or automatically controlled to dispense a single object from the charging portion 18 to the discharging portion 20 of passageway 14 at selected intervals. Feeder track assembly 10 is a gravity influenced conveying apparatus. That is to say, the motive force by which the feeder track assembly 10 performs its conveying function is the force of gravity.

In typical applications, an inlet 22 at the upper end of the charging portion 18 of passageway 14 receives objects (not illustrated) which fall from a supply means 24, such as a hopper bin or the like, under the influence of gravity. A funnel, oscillating ring or similar channelling device 26 may be used to facilitate passage of the objects from the supply means 24 to the inlet 22. The objects in turn fill the charging portion 18 of passageway 14 and are released individually into the discharging portion 20 of the passageway 14 upon activation of the metering mechanism 16. The lower end of the discharging portion 20 of passageway 14 defines an outlet 28 from which the objects are delivered to a desired intermediate or end destination 30 which may comprise, without limitation, a packaging container or an object processing station. Furthermore, although but a single feeder track assembly 10 is shown, it is quite common for many such assemblies to be functioning simultaneously on a single support structure (not illustrated). Common examples of such a support structure include a stationary support or a movable support such as a rotatable drum or the like that may be timed to move in synchronicity with the intermediate or end destination 30.

In many situations, objects contained in the supply means 24 are disposed in random orientations. It is frequently desirable to convey such randomly disposed objects using gravity influenced conveying apparatus so that the objects arrive at an intended destination such as destination 30 in a very specific spatial orientation or disposition. For instance, at certain stages in the manufacture of pharmaceutical products such as tablets, caplets, capsules, pills and the like, individual tablets or similar objects are amassed in a supply means corresponding to supply means 24 from which the objects must be delivered in a predetermined and uniform orientation for further processing or packaging, e.g., for insertion into thin paper or foil pouches. At present, conveying apparatus such as feeder track assembly 10 are deployed to perform this function.

The horizontal cross-sectional configuration of the passageway 14 of existing pharmaceutical product feeder track assemblies such as assembly 10 may assume, depending on the shape or product to be conveyed, any of several shapes, including, but not limited to, curvilinear shapes, e.g., circular, oval and elliptical, polygonal shapes, e.g., triangular, square, rectangular, as well as more complex forms such as T, + and X shapes. A representative example of a cross-sectional configuration adapted to closely accommodate the shape of a tablet or caplet is the generally +-shaped passageway 14 shown in FIG. 2. The dashed line image depicted in the passageway 14 represents a profile of a typically shaped tablet or caplet. Under ideal conditions, objects entering the inlet of such a passageway at a desired orientation and maintain that orientation until delivered from the passageway's outlet to their intended destination.

In the typical case, however, constant cross-section passageways tend to hinder effective operation of either or both the charging and discharging portions 18, 20 of the passageway 14. More specifically, if the cross-sectional dimensions of the feeder track passageway are greater than the largest dimensions of the objects conveyed therethrough, then the objects typically fill the upper charging portion 18 of the passageway without jamming, wedging or otherwise encountering obstructive resistance. On the other hand, an oversized passageway is inherently incapable of positioning an object into a desired orientation as it traverses the discharging portion 20 of the passageway.

Conversely, other feeder track passageways, such as the illustrated passageway 14, have constant cross-sectional shapes that are specially contoured to closely accommodate the exterior shapes of the objects they are designed to convey. Such product-specific feeder track passageways are problematic for several reasons. For instance, feeder tracks of this sort typically are able to pass only those objects that are aligned in a specific orientation upon entering the feeder track passageway 14. Hence, any object delivered from supply means 24 that is not in precise alignment with the passageway inlet 22 cannot enter the passageway 14.

In addition, the spatial tolerances of such passageways are very strict. The purpose of such close tolerances is to assure that objects conveyed by the passageway 14 are delivered in single file from the inlet 22 to the metering mechanism 16. A disadvantage of tight product tolerances, however, is that products which successfully enter the passageway inlet 22 frequently shift and become wedged or jammed as they fall through the passageway 14. This phenomenon is especially pronounced when the feeder track assembly 10 is used to convey pill-like pharmaceutical products such as tablets and caplets. Existing technology is constrained from producing pill-like pharmaceutical products of perfectly uniform size and shape because of the physical characteristics of the compositions which make up the pharmaceuticals and/or their coatings. By way of illustration, gel-coated tablets are notorious for exhibiting considerable variance in coating thickness among different tablets, as well as across the surface of individual tablets. Apart from increasing the likelihood of jamming, the variability in the size and shape of such products can also inhibit their successful entry into the inlet 22 of a feeder track 14 having tight product tolerances.

Moreover, a feeder track assembly having a passageway of constant, product-specific cross-section such as passageway 14 may also malfunction with respect to objects that have successfully entered the passageway and reached the metering mechanism 16. More particularly, activation of the metering mechanism 16 usually results in some shifting of an object as it is dispensed from the charging portion 18 to the discharging portion 20 of the passageway 14. This shifting frequently is sufficient to cause an object to become misaligned and, therefore, wedged or jammed in the discharge portion 20 of the passageway 14.

Figure 5:
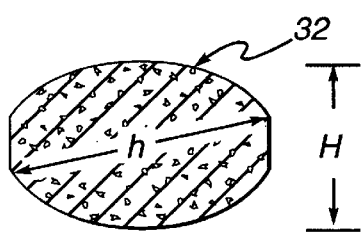
FIG. 5 is an elevational cross-sectional view of the object shown in FIGS. 3 and 4 taken along line V—V of FIG. 3.
Figure 6:
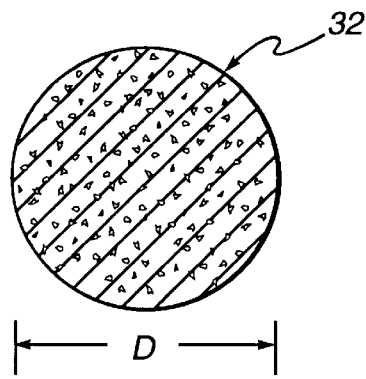
FIG. 6 is a horizontal cross-sectional view of the object shown in FIGS. 3 and 4 taken along line VI—VI of FIG. 4.

FIGS. 3, 4, 5, and 6 illustrate various views of a typical object 32 suitable for being conveyed by the feeder track assembly of the present invention, which assembly is described in greater detail hereinafter in connection with the discussion of FIGS. 8 through 18 and generally identified therein by reference numeral 110. Viewing FIGS. 3 through 6 collectively, it is seen that object 32 is formed as a standard circular pharmaceutical tablet having a diameter "D" and a height "H". Height H is the sum of the heights of a substantially cylindrical central portion 34 and truncated, substantially spherical upper and lower portions 36 and 38. As seen in FIG. 5, the largest dimension of tablet 32 is the hypotenuse "h" extending from a lower edge of one side of the substantially cylindrical central portion 34 to the upper edge of a diametrically opposite side of central portion 34 in any vertical plane passing through the geometric center of the tablet. For most pharmaceutical tablets hypotenuse "h" is typically only slightly greater than diameter D, e.g., less than a few thousandths of an inch, and is a determinative factor only in the design of the upper charging portion of the passageway of the feeder track assembly 110 of the present invention, as will be later described. And, as is typical of such tablets, diameter D is at least as large and most commonly larger than height H.

The invention will be described in regard to orientation of pharmaceutical products such as tablet 32 because such products represent a broad category of products with which the feeder track assembly 10 would find especially beneficial application. It will be understood, however, that any objects of substantially uniform size and shape other than a perfect sphere, are capable of alignment into a predetermined orientation using a feeder track assembly 110 constructed to appropriate scale in accordance with the present invention.

Figure 7:
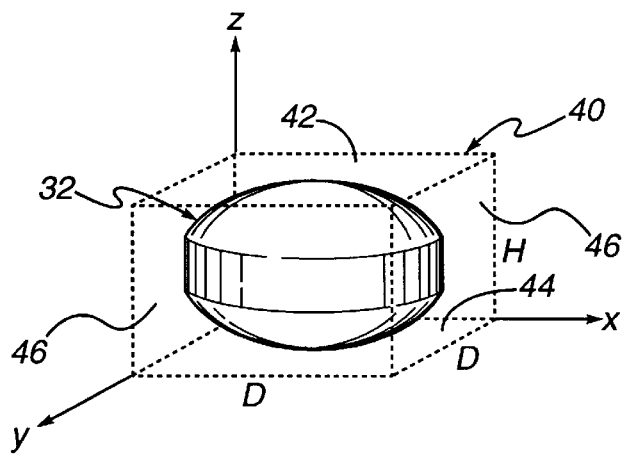
FIG. 7 is a perspective view of the object shown in FIG. 3 superimposed upon a three-dimensional Cartesian coordinate axis system.
Figure 10:
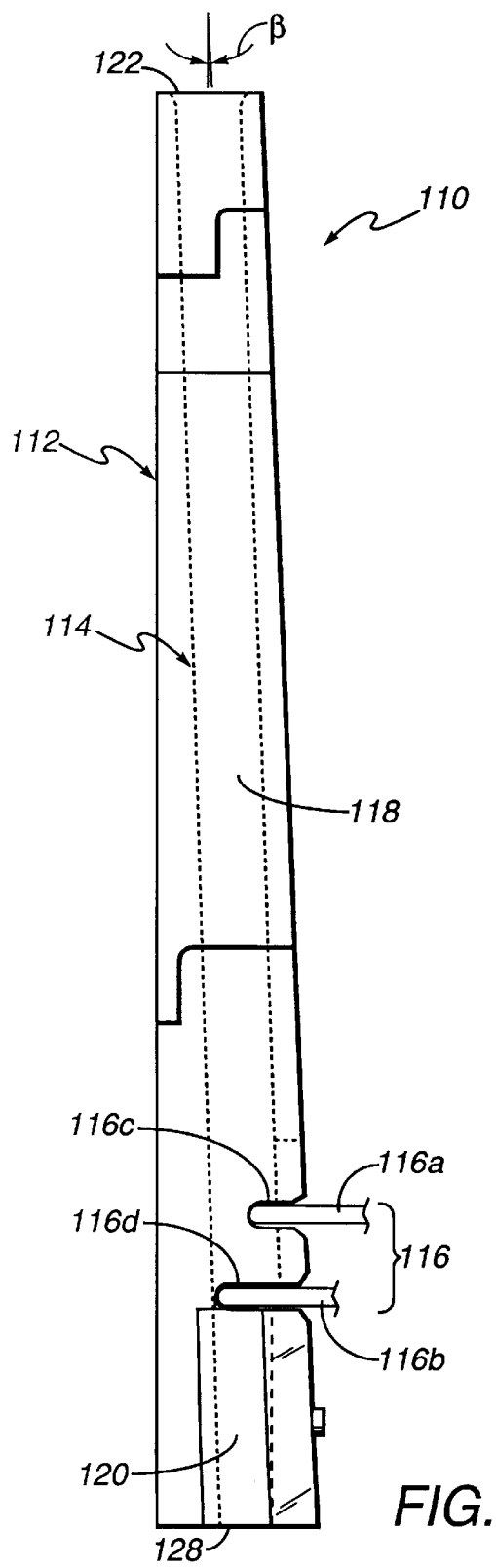
FIG. 10 is a side elevational view, including metering means, of the feeder track assembly of FIG. 8.

Referring to FIG. 7, the object 32 is superimposed upon a three-dimensional Cartesian (a.k.a. rectangular or orthogonal) coordinate axis system. As is conventional, arrows x and y correspond to the reference axes of a horizontal plane and arrow z corresponds to a reference axis representing vertical distance from the horizontal x-y plane. As depicted in dashed line, superimposed upon and circumscribing object 32 is a right, rectangular prism 40. Prism 40 defines an upper rectangular area 42 and a lower rectangular area 44 corresponding in size and shape and extending parallel to the upper rectangular area 42. Prism 40 further defines four rectangular side areas 46 each of which extend between and at right angles to respective ones of the four corresponding edges of the upper and lower rectangular areas 42 and 44. The terms "rectangle" or "rectangular areas" as used in the present context should be construed to mean any parallelogram having four interior right angles including squares and the commonly recognized rectangle having two parallel long sides bounded at right angles by two parallel short sides. Upper and lower rectangular areas 42 and 44 are defined in both the x- and y-dimensions by distances equal to the diameter D of object 32. Each of the rectangular side areas 46 are defined in either the x- or y-dimensions by diameter D and in the z-dimension by height H of object 32. The configuration of and area defined by each of the upper and lower rectangles 42 and 44 are thus greater than the configurations and areas defined by each of the side rectangles 46.

Although not illustrated, for objects of somewhat elongated configuration, right rectangular prism 40 would be established by upper and lower rectangles defining a first rectangular area, two opposed side rectangles defining a second rectangular area different from said first rectangular area, and two other opposed side rectangles defining a third rectangular area different from both said first and second rectangular areas. For purposes of the present invention, the phrase "first rectangular area" will refer, with respect to any object suitable for conveyance by feeder track assembly 110, to the opposed rectangular surfaces of a hypothetical prism such as prism 40 having the largest dimensions whether considered in any of the mutually orthogonal x-y, x-z and y-z Cartesian coordinate planes. More simply stated, the "first cross-sectional area" circumscribes the area of largest cross-sectional dimensions of the object to be conveyed. Similarly, the phrase "second rectangular area" will refer to the rectangular opposed surfaces of a hypothetical prism having lesser dimensions than the "first rectangular area," wherein the second rectangular area may include the opposed surfaces of a hypothetical prism which circumscribe either the intermediate or smallest cross-sectional dimensions of the object to be conveyed as considered in any of the x-y, x-z and y-z planes.

Turning collectively to FIGS. 8 through 11, there is illustrated a feeder track assembly 110 constructed in accordance with the present invention. Assembly 110 is a gravity influenced conveying device and comprises an elongate main body member 112, which may alternatively be referred to as a feeder block, feeder tube or the like. The main body member may be fabricated from any suitable rigid material including, without limitation, metal or plastic. A preferred material is aluminum bar stock. In operation, main body member 112 is disposed substantially vertically in the manner of main body member 12 of feeder track assembly 10 discussed above in connection with FIGS. 1 and 2.

Main body member 112 has an internal throat or passageway 114 extending the length thereof. Feeder track assembly further comprises a metering means 116 (FIG. 10) which divides the passageway into an upper charging portion 118 and a lower discharging portion 120. The metering means 116, which may alternatively be referred to as an escapement means, may include one or, as illustrated, two reciprocable plates, pins, rubber bands or other movable members 116a and 116b, that cooperate, respectively, with slots or grooves 116c and 116d provided in a wall, either a rear wall, a side wall or, as shown, a front wall of the main body member 112. As will be described in greater detail with regard to FIGS. 15 through 17, the movable members 116a, 116b of metering means 116 may be manually or automatically controlled (such as by conventional unillustrated linear actuators including, without limitation, solenoids, hydraulic cylinders, pneumatic cylinders and the like) to dispense individual objects from the charging portion 118 to the discharging portion 120 of passageway 114 at selected intervals.

Figure 11:
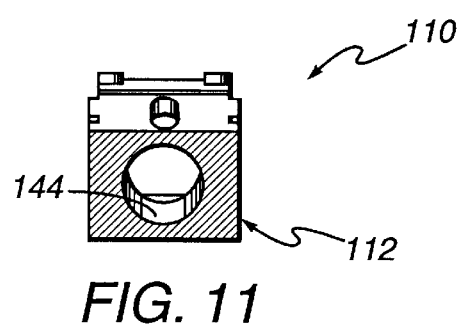
FIG. 11 is a cross-sectional view of the main body member of the feeder track assembly of the present invention taken along line XI—XI of FIG. 8.

As perhaps best illustrated in FIGS. 9 and 11, the cross-sectional shape of the upper charging portion 118 of passageway 114 is desirably, but not necessarily, circular. Regardless of its actual shape, however, the dimensions of the upper charging portion 118 are preferably greater in all directions than the largest dimension of an object to be conveyed by the feeder track assembly 10, e.g., greater that the hypotenuse h of object 32 (FIG. 5).

Figure 15:
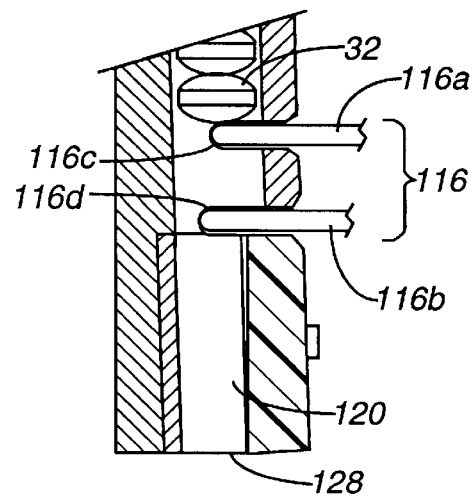
FIGS. 15 through 17 depict reveal sequential phases of operation of the metering means of the feeder track assembly of the present invention.
Figure 16:
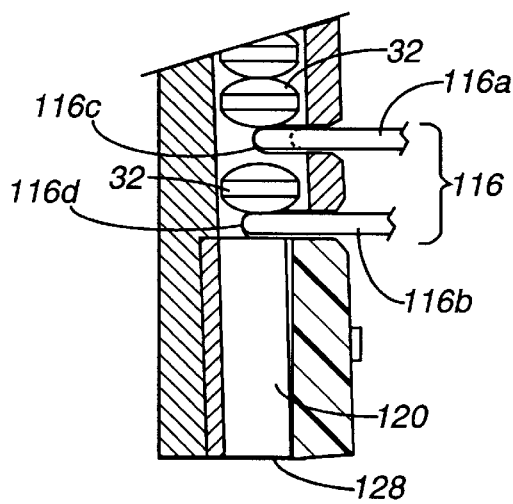
Figure 17:
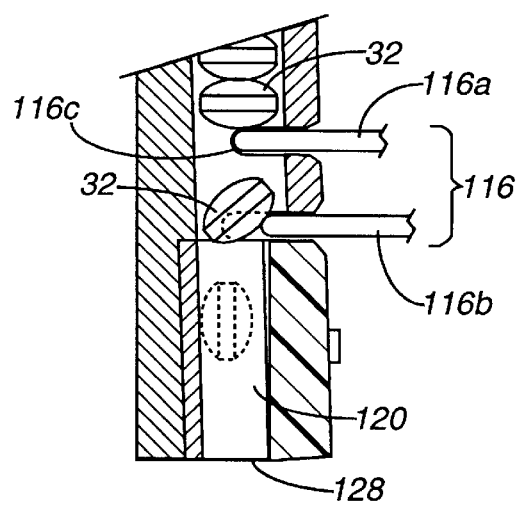

In operation, an inlet 122 at the upper end of passageway 114 received objects, such as objects 32 (FIGS. 3 through 7 and FIGS. 15 through 17), which fall under the influence of gravity from an unillustrated supply means such as a hopper, bin or the like similar to the supply means 24 of FIG. 1. A funnel, oscillating ring or other channelling device (not illustrated) similar to the channelling device 26 of FIG. 1 may be used to facilitate passage of the objects 32 from the supply means to the inlet 122. The objects 32 in turn fill the charging portion 118 of the passageway 114, as shown in FIGS. 15 through 17, and are released individually into the discharging portion 120 of the passageway 114 upon activation of the metering means 116, as will be described in connection with FIGS. 15 through 17.

The lower end of the discharging portion 120 of passageway 114 defines an outlet 128 from which the objects 32 are delivered to a desired intermediate or end destination which may comprise, without limitation, a packaging container or an object processing station similar to destination 30 shown in FIG. 1. Furthermore, although but a single feeder track assembly 110 is shown, it is also contemplated that a plurality of such assemblies may be functioning simultaneously on a single support structure (not illustrated). Examples of such a support structure include a stationary support or a movable support, e.g., a rotating drum or the like, that may be timed to move in synchronicity with the intermediate or end destination in any suitable manner known to those skilled in the art.

Considerable practical benefit is realized by sizing the upper charging portion 118 of passageway 120 such that its cross-sectional dimensions exceed in any direction the largest dimension of the objects to be conveyed. For example, by oversizing the cross-sectional configuration of the upper charging portion 118 the problem of unsuccessful product entry into the inlet 122 is effectively eliminated, as is the problem of wedging of products in the upper charging portion 118.

Preferably, the cross-sectional size and shape of the upper charging portion 118 the passageway 114 is maintained in the region of the main body member 112 spanned by the metering means 116. In this way, obstructional difficulties are likewise avoided when an object passes from the upper charging portion 118 into a later described "escapement section" of the main body member 112 which is bounded by the movable members 116a, 116b of metering means 116. In addition, the cross-sectional dimensions and the incremental height of the passageway 114 in the escapement section cooperatively serve to minimize the likelihood of malfunctions of the metering means 116.

The discharging portion 120 of the passageway 114 is thus defined by the distance from the exit of the escapement section to the passageway outlet 128. The cross-sectional dimensions of the discharge portion 120 of passageway 114 may be constant throughout the length of the discharge portion. Preferably, however, and as can be appreciated perhaps most readily by comparing FIGS. 12 and 13, at least one cross-sectional dimension of the discharge portion 120 is reduced in size in progressing from the upstream end of the discharge to the outlet 128.

Figure 12:
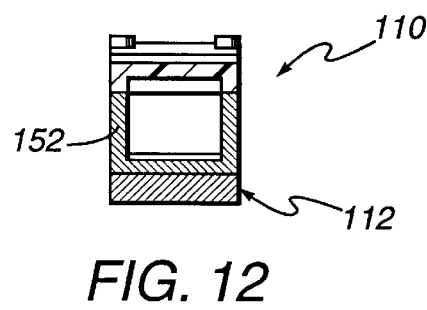
FIG. 12 is a cross-sectional view of the main body member of the feeder track assembly of the present invention taken along line XII—XII of FIG. 8.

More particularly, FIG. 12 reveals that the cross-sectional configuration of the discharge portion 118 at the upstream end thereof is preferably rectangular in shape. Both dimensions of this rectangular shape may be greater than or equal to the aforementioned first rectangular area circumscribing the largest cross-sectional dimensions of the objects to be conveyed (hereinafter "the first rectangular area"). See, for example, upper and lower rectangular areas 42, 44 of prism 40 in FIG. 7. In accordance with the presently embodiment of feeder track assembly 110, however, the shorter of the two cross-sectional dimensions of the upper end of the discharge portion 118 is slightly smaller than the shortest dimension of the first rectangular area, e.g., distance D corresponding to the diameter of object 32 (FIG. 7).

Figure 13:
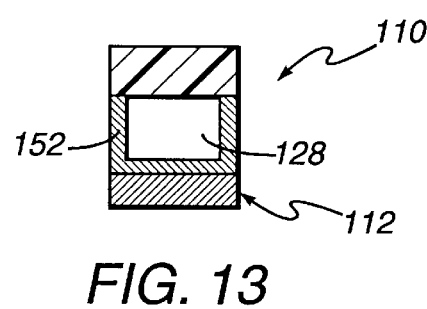
FIG. 13 is a cross-sectional view of the main body member of the feeder track assembly of the present invention taken along line XIII—XIII of FIG. 8.

Turning to FIG. 13, there is shown a presently preferred cross-sectional configuration of the discharge portion 120 of passageway 114 essentially at the outlet 128. At this location, the shorter of the two cross-sectional dimensions of the discharge portion 120 of passageway 114 is preferably somewhat greater than the shortest dimension of the first rectangular area, e.g., height H of object 32. Indeed, it is desirable that the shorter cross-sectional dimension of the discharge portion 120 at outlet 128 be only slightly greater than the smaller dimension of the aforementioned second rectangular area circumscribing the intermediate or the smallest cross-sectional dimensions of the object to be conveyed (hereinafter "the second rectangular area"). By way of example, the shorter cross-sectional dimension of passageway 114 should be, when object 32 is conveyed by the feeder track assembly 110, slightly greater than the height H of any of the rectangular side areas 46 of prism 40 in FIG. 7. Hence, the upper end of the discharge portion 120 preferably should assume a substantially rectangular cross-sectional configuration slightly smaller in at least one dimension than the first rectangular area of a hypothetical prism circumscribing the largest cross-sectional dimensions of an object to be conveyed. And, the discharge portion 120 preferably should taper in size such that outlet 128 assumes a substantially rectangular cross-sectional configuration slightly larger in at least one dimension than a second rectangular area of a hypothetical prism circumscribing the intermediate or the smallest cross-sectional dimensions of an object to be conveyed. It will further be understood that such intermediate and smallest cross-sectional dimensions will be equal in regard to circular objects such as object 32.

Figure 14:
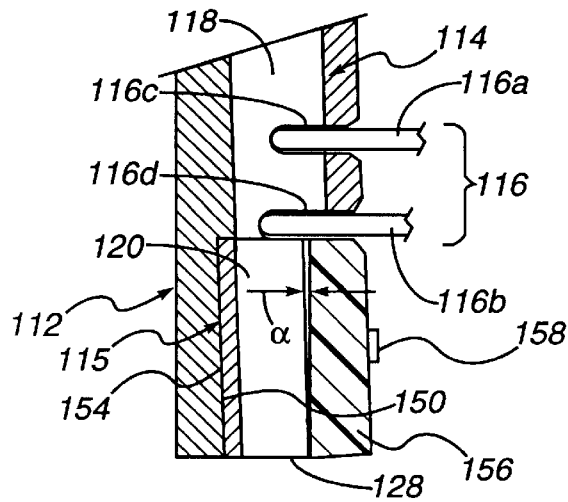
FIG. 14 is an enlarged vertical cross-sectional view of the lower region of the feeder track assembly of the present invention.

FIG. 14 illustrates on an enlarged scale the lower region of the feeder track assembly 110, including the lower end of the upper charging portion 118 of passageway 114, the escapement section spanned by the upper and lower movable members 116a, 116b of metering means 116, and the discharge portion 120 of passageway 114. As noted hereinabove, the main body member 112 may be formed from any suitable rigid material. If formed of plastics, for example, the main body member may be molded as two mirror image components that may be joined longitudinally by heat, solvent or adhesive bonding. Each of these components would have preformed therein one-half of the desired cross-sectional shapes of the passageway 114, including the particular shapes ascribed to the upper charging portion 118, the escapement section, and the lower discharging portion 120. In addition, each main body component may be preformed with one half of each of grooves 116c and 116d or, alternatively, these grooves may be provided after joining of the main body member component halves.

According to a presently preferred embodiment, however, main body member 112 is fabricated from aluminum bar stock which is longitudinally bored to produce the upper charging portion 118 and the escapement section of passageway 114. The lower portion of the main body member 112 is milled, ground or otherwise machined to produce a substantially flat surface 150. A separate three-sided channel member 152, which may be formed of aluminum or other rigid material, and having a substantially flat surface 154 corresponding substantially in size and shape to surface 150 is then positioned such that surfaces 150 and 154 abut one another. The outwardly open side of channel member 152 which faces the front wall of the main body member 112 may then be enclosed with a rigid, substantially flat plate 156 to establish the discharge portion 120 of passageway 114. Preferably, although not necessarily, flat plate 156 is fabricated from transparent material such as Lexan®, Plexiglas® or the like such that a user can visually monitor the operation feeder track assembly 110. Plate 156, channel member 152 and the lower portion of the main body member 112 may be permanently attached to one another by adhesives. More preferably, however, these elements are releasably connected by suitable fastening means such as screws 158. In this way, any desired cross-section may be created in the lower discharge portion 120 to accommodate any object that may be suitable for conveyance by the feeder track assembly 110. Alternatively, the channel member 152 and plate 156 may be formed as a unitary plastic or metal tube that can be releasably or fixedly attached to surface 150 of the main body member. It should be apparent that similar constructions for establishing the lower discharging portion 120 of passageway 114 may be envisioned.

For instance, the lower discharging portion 120 may be constructed from one or more movable members the relative spacing of which may be selectively adjusted to accommodate differently sized objects to be conveyed by the feeder track assembly 110. Furthermore, the lower discharging portion 120 may be constructed within a discrete subassembly that may be attached to conventional feeder track assemblies such as assembly 10 of FIG. 1 that may have oversized product passageways, i.e., passageways having cross-sectional dimensions which exceed in any direction the largest dimension of objects which they convey. In that way, such feeder track assemblies may be retrofitted with structure incorporating the beneficial features of the lower discharging portion 120 of passageway 114 of feeder track assembly 110 and thereby realize the operational advantages of the present invention.

As earlier mentioned, the cross-sectional dimensions of the lower discharge portion 120 of the passageway 114 preferably taper in size from the upstream end of the discharge portion to the passageway outlet 128. This may be achieved by inclining one or more of the interior walls of channel member 152 and/or plate 156. In a preferred construction, this effect may be simply effected by providing a slope to the inner surface of the plate 156 as indicated by angle α. As such, different plates having differently sloped, curved or otherwise contoured interior surfaces may be readily substituted to accommodate the structural pecularities of different objects that may be conveyed by the feeder track assembly 110.

FIGS. 15 through 17 depict sequential phases of operation of the metering means 116 which span the escapement section of the feeder track assembly 110.

Referring initially to FIG. 15, the metering means 116 is shown in a "ready" position prior to capturing an object 32. In this state, movable members 116a, 116b of metering means 116 are fully inserted into their respective corresponding grooves 116c, 116d in main body member 112, and upper movable member 116a supports a stack of objects 32 contained within upper charging portion 118.

In FIG. 16, the metering means 116 is shown as it would appear when disposed in a "capture" position. To achieve this state, the lower movable member 116b remains inserted into the lower groove 116d. Concurrently, the upper movable member 116a is momentarily retracted, either manually or by an unillustrated conventional linear actuator, to the position illustrated in phantom line whereupon the lowermost object 32 drops from the upper charging portion 118 and comes to rest on the lower movable member 116b. The upper movable member 116a is then reinserted into the upper groove 116c as shown.

FIG. 17 reflects the metering means in a "discharge" position with an object 32 shown falling from the lower movable member 116b into the discharge portion 120 of passageway 114. In this state of operation, the upper movable member 116a remains inserted in the upper groove 116c. Lower movable member 116b is then retracted, either manually or by an unillustrated conventional linear actuator, to the position illustrated. As the lower movable member 116b is retracted, the captured object 32 begins to tip and then falls in the manner shown in phantom line into the upstream end of the discharge portion 120 of passageway. Once the object 32 comes into contact with the walls of the discharge portion 120, it begins to become positioned into the orientation prescribed by the interior walls of the discharge portion. Upon the object's exit from the escapement section, the lower movable member 116b is reinserted into the lower groove 116d, whereby the metering means reassumes the "ready" position shown in FIG. 15 and the object dispensing process may begin anew.

Figure 18:
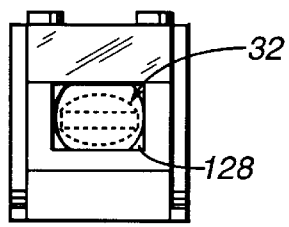
FIG. 18 is a bottom end view of the feeder track assembly of FIG. 8.

FIG. 18 illustrates a bottom view of the feeder track assembly 110 showing the disposition of an object 32 as it exits passageway outlet 128. As explained earlier, outlet 128 preferably is configured as a rectangle of slightly larger dimensions than a rectangular area circumscribing the intermediate or smallest cross-sectional dimensions of the object 32 as considered in the three mutually orthogonal x-y, x-z and y-z planes shown in FIG. 7, i.e., rectangular side areas 44 shown on that figure.

Because of the circular symmetry of object 32 the intermediate and smallest cross-sectional dimensions of the object are the same. As for objects having somewhat elongated shapes, the passageway outlet may be configured to assume a generally rectangular configuration slightly larger than either the intermediate or the smallest cross-sectional dimensions of such objects depending upon the desired exit orientation of the objects.

It will be understood that the cross-sectional shape of the discharge portion 120 of the passageway 114 need not be rectangular. A rectangular shape is a presently preferred way of realizing the objectives of the present invention, however, as it is a simple shape to achieve using conventional materials and manufacturing/assembly techniques. The only practical restriction on the cross-sectional shape of the discharge portion is that it must be capable of orienting an object into a predetermined and substantially uniform orientation upon exit of the object from the passageway outlet 128.

An optional yet preferable feature of feeder track assembly 110 is an elongated slot 160 (FIGS. 8 and 9) provided in the upper portion of main body member 112. Slot 160 enables access to the upper charging portion 118 of passageway 114 to dislodge objects that may become lodged in the upper charging portion. In addition, it is also preferable to incline passageway 114 with respect to vertical at a relatively small acute angle β (FIGS. 9 and 10) of less than about 5° as such inclination has been found to minimize object jamming throughout passageway 114.

Feeder apparatus 110 may be constructed to any scale necessary to convey objects of substantially uniform size and shape. As such, the terms "larger," "slightly larger," "slightly smaller" and similar terms used to describe the cross-sectional dimensions of the charging portion 118 and the discharging portion 120 of passageway 114 versus the dimensions of the objects to be conveyed are relative. Hence, the passageway tolerances to which they refer may vary considerably depending on the size, shape and external surface characteristics of the conveyed objects. For example, comparatively small objects such as pharmaceutical pills and the like may require no more than a few hundredths of an inch tolerance when passing through discharge portion 120. It is conceivable that much larger objects may require greater tolerances, e.g., up to one inch or more, as circumstances may dictate. However, regardless of the size and shape of the objects to be conveyed, the tolerances of the discharge portion 120 of passageway 114 must neither be so small as to hinder passage of the objects nor so large as to inhibit proper orientation of the objects upon their exit from passageway outlet 128.

The combination of the main body member 112 and metering means 116 thus may be viewed conceptually as dividing the feeder track assembly 110 of the present invention into several distinct yet cooperating sections.

The first of these sections, which comprises that portion of the main body member 112 extending from the upper end of the main body member to the metering means 116, may be referred to as the "free transfer section." The free transfer section thus embraces the entire upper charging portion 118 of the internal passageway 114. Because the cross-sectional dimensions of the upper charging portion are greater than the largest dimensions of the objects being conveyed, the free transfer section, which desirably constitutes that longest segment of the feeder track assembly, will allow objects to travel preferably the majority of the track distance without any restriction or imposition into any predetermined orientation.

The next section, which essentially comprises that portion of the main body member 112 spanned by the metering means 116, may be referred to as the "escapement section." The cross-sectional dimensions of the passageway 114 in the escapement section are preferably the same as the free transfer section. The height of the escapement section must be at least slightly greater than the smallest cross-sectional dimension of an object to be conveyed, e.g., height H of object 32. According to techniques known in the art, the metering means 116 preferably is operated so as to capture an object from the upper charging portion 118 of the passageway, momentarily retain the object in the escapement section, and then release the object to the lower discharge portion 120.

The following section, which comprises that portion of the main body member 112 immediately beneath the metering means 116, may be referred to as the "transition section." The transition section constitutes at least an upper region of the discharge portion 120 of the internal passageway 114. Preferably, the cross-sectional configuration of the transition section should be slightly smaller than a rectangular area circumscribing the area of largest cross-sectional dimensions of a conveyed object, e.g., upper and lower rectangular areas 42, 44 of prism 40 circumscribing object 32 (FIG. 7). The height of the transition section should be at least as great but, desirably, not appreciably greater than the largest dimension of the conveyed object, e.g., hypotenuse h of object 32 (FIG. 5). This will assure that the object has sufficient space within which to tip and and begin its fall from the escapement section without becoming lodged in the mouth or upstream end of the discharge portion 120. And, that portion of the internal passageway 114 spanned by the transition section preferably tapers in size from the escapement section to the end of the transition section. In operation, once an object is released from the escapement section by the metering means 116, it will fall through the transition section and begin to assume a desired orientation as a result of the specific falling tendency of the object as influenced by the physical constraints of the transition section, gravity, and the specific operation of the metering means 116.

The final section, which comprises that portion of the main body member 112 extending from the end of the transition section to the outlet 128 of the discharge portion 120 of the internal passageway may be referred to as the "controlled exit section." The controlled exit section thus defines the lower region of the discharge portion of the passageway. The cross-sectional configuration of the controlled exit section is preferably the same as the transition section. The cross-sectional dimensions of the controlled exit section, however, should taper smoothly from the transition section to the outlet 128 of the passageway 114. Moreover, the cross-sectional configuration of the outlet 128 should be slightly larger than a rectangular area circumscribing a cross-sectional area of the objects to be conveyed which is of lesser cross-sectional dimensions that the largest cross-sectional dimensions of the objects. The height of the controlled exit section is not critical, although the outlet of the controlled exit section should be at an elevation suitable to deliver an object to a desired location and in the orientation prescribed by the walls of the discharge portion at the outlet 128. The controlled exit section's function is to continue orienting an object as initially oriented by the transition section and to discharge the object through the bottom of the feeder track assembly in proper orientation for delivery to its intended destination.

The feeder track assembly according to the present invention is thus capable of reliably conveying objects from a first location, such as a hopper, where the orientation of such objects is essentially random, to a second location, such as a packaging container or processing station, where the orientation of such objects is predetermined and substantially uniform.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A conveying apparatus for conveying objects under the influence of gravity from a first location where the orientations of said objects are random to a second location where the objects assume a predetermined orientation, said apparatus comprising:

a main body member; and a substantially vertical passageway provided in at least a portion of said main body member and through which objects to be conveyed by said conveying apparatus are conveyed, said passageway comprising:

a first portion including inlet means for receiving said objects, said first portion defining a first cross-sectional configuration; and a second portion including outlet means for discharging said objects, said second portion defining a second cross-sectional configuration different from said first cross-sectional configuration, said second cross-sectional configuration being operable to position objects discharged from said outlet into said predetermined orientation.

2. The conveying apparatus of claim 1 further comprising means for dispensing objects from said first portion to said second portion.

3. The conveying apparatus of claim 2 wherein said means for dispensing includes means for delivering one object at the time from said first portion to said second portion.

4. The conveying means of claim 1 wherein the dimensions of said first cross-sectional configuration are greater in all directions than the largest dimension of objects to be conveyed by said conveying apparatus.

5. The conveying means of claim 4 wherein said first cross-sectional configuration is substantially circular.

6. The conveying means of claim 1 wherein said second cross-sectional configuration is smaller than a first rectangular area circumscribing an area of largest cross-sectional dimensions of objects to be conveyed by said conveying apparatus.

7. The conveying apparatus of claim 1 wherein said second cross-sectional configuration is substantially rectangular.

8. The conveying apparatus of claim 1 wherein said second cross-sectional configuration decreases in size from an upstream end of said second portion to said outlet.

9. The conveying apparatus of claim 1 further comprising means connected to said main body member for establishing at least a part of said second portion of said passageway.

10. The conveying apparatus of claim 9 wherein said means for establishing at least a part of said second portion is detachably connectable to said main body member.

11. The conveying apparatus of claim 1 wherein said passageway is inclined at an acute angle with respect to vertical.

12. The conveying apparatus of claim 1 further comprising means for enabling access to said first portion of said passageway to dislodge objects that may become lodged in said first portion.

13. In a conveying apparatus having a main body member and a passageway extending through said main body member, wherein said passageway is operable to convey objects through said main body member and defines a first cross-sectional configuration having dimensions greater in all directions than the largest dimensions of objects to be conveyed by said conveying apparatus, the improvement comprising means securable to said conveying apparatus adjacent an outlet of said passageway and coextensive with said passageway, said additional passageway defining a second cross-sectional configuration, said second cross-sectional configuration being operable to position objects conveyed by said conveying apparatus into a predetermined orientation, wherein the first cross-sectional configuration and second cross-sectional configuration form a substantially vertical passageway.

* * * * *

UNITED STATES PATENT AND TRADEMARK OFFICE
CERTIFICATE OF CORRECTION

PATENT NO. : 5,845,810
DATED : Dec. 8, 1998
INVENTOR(S) : Laznicka

It is certified that error appears in the above-indentified patent and that said Letters Patent is hereby corrected as shown below:

Claim 13, line 10, kindly insert after "passageway"(first occurrence) --for establishing an additional passageway substantially coextensive with said passageway--

Claim 13, line 11, kindly insert after "configuration" --different from said first cross-sectional configuration--

Signed and Sealed this

Twentieth Day of July, 1999

Attest:

Q. TODD DICKINSON

*Attesting Officer*   *Acting Commissioner of Patents and Trademarks*